United States Patent [19]
Heitmann

[11] Patent Number: 4,764,816
[45] Date of Patent: Aug. 16, 1988

[54] METHOD FOR OPTIMIZING A MAGNETIC TAPE DEVICE FOR STORING DIGITALLY CODED COLOR TELEVISION SIGNALS

[75] Inventor: Jürgen Heitmann, Arlsbach-Hähnlein, Fed. Rep. of Germany

[73] Assignee: Robert Bosch GmbH, Stuttgart, Fed. Rep. of Germany

[21] Appl. No.: 899,072

[22] Filed: Aug. 21, 1986

[30] Foreign Application Priority Data

Aug. 23, 1985 [DE] Fed. Rep. of Germany ....... 3530142

[51] Int. Cl.⁴ ........................ H04N 9/80; G11B 27/36

[52] U.S. Cl. ...................................... 358/327; 360/31; 360/68

[58] Field of Search .................... 360/31, 35.1, 61, 62, 360/68; 358/310, 327; 371/28

[56] References Cited

U.S. PATENT DOCUMENTS 4,295,168 10/1981 Muller .................................. 360/66
4,504,870 3/1985 Kitamura et al. ..................... 360/31

FOREIGN PATENT DOCUMENTS 1127942 4/1962 Fed. Rep. of Germany .
1909429 4/1978 Fed. Rep. of Germany .
2758307 7/1979 Fed. Rep. of Germany .

*Primary Examiner*—Donald McElheny, Jr.
*Attorney, Agent, or Firm*—Frishauf, Holtz, Goodman & Woodward

[57] ABSTRACT

A full-frame memory for television signals is filled while the tape transport speed is reduced to a small fraction of its normal speed while a selected of the head-wheel of a recorder-reproducer first records a segment of a frame recorded in one oblique track, then is switched to reproduction that reads the track just recorded. In the next frame a second segment is similarly recorded, reproduced and stored for the second frame, and so on. After a complete set of segments are put in memory a complete composite picture can be reproduced therefrom and of course the content of the memory can be displayed in the intervals between the recording of segments. A pixel error detector is used both for displaying errors by setting all recognizably faulty pixels to picture black and also counting the number of recognizably defective pixels per segment. While this evaluation procedure is being run, the recording current, the pre-emphasis and the de-emphasis adjustments can be varied so that they can ultimately be set at the settings which produce the lowest error rate in the reproduced picture.

5 Claims, 2 Drawing Sheets

PWR. IN
SIG. INPUT
SIG. OUT (DISPLAY)

PIXEL ERROR COUNT & REC.
READ
FULL FRAME MEMORY
20
18
NORMAL
TEST
N
T
17
21
WRITE
FRAME & TRACK COUNTER AND SW. CONTROL
19
AMP.
SYNCH. R'TR'V'L
PWR
RECORD
PLAY
16
15
TAPE DRIVE
12
11

METHOD FOR OPTIMIZING A MAGNETIC TAPE DEVICE FOR STORING DIGITALLY CODED COLOR TELEVISION SIGNALS

The invention concerns the optimization of magnetic tape machines by which digitally coded color television signals are recorded and later reproduced, utilizing normal digitally coded picture signals instead of a sequence of test pulses.

The test pulse sequence of the optimization methods previously used contains a 50 MHz component for adjusting the input circuit current of each electromagnetic transducer for recording (usually referred to as a recording head) at maximum sensitivity.

For that purpose the transport speed of the tape is reduced to a fraction of the normal speed (⅓ to 1/5) and an electromagnetic transducer mounted on the periphery of the head-wheel is switched into the recording mode, while a following transducer reproduces the signal recorded by the first transducer. As a result of the reduced tape speed the following transducer mainly follows the track previously recorded running transversely or obliquely across the tape, which was recorded just before. It is not possible with the known method of optimizing just described to adjust simultaneously the pre-distortion or pre-emphasis applied to the signal to be recorded and the distortion elimination or de-emphasis of the reproduced signal. There is the further disadvantage that the sensitivity maximum is not reached with the same adjustment of the recording current which corresponds in the later reproduction to the lowest error rate in the reproduced signal.

It is known from DE-AS No. 11 27 942 to provide a second magnetic head on a head-wheel in addition to the revolving magnetic head already provided, the additional head being so mounted on the periphery and with an axial offset that for monitoring purposes it can be switched to reproduction at the same time that the first magnetic head is recorded while passing over the same tape surface region. The provision of supplementary magnetic heads for monitoring the recording which are subjected to the same wear as the recording heads involves an undesired cost factor, however. In addition at least one rotating coupling is needed for leading the monitoring signals from the head-wheel to the monitoring circuits. In the case of magnetic tape devices with many magnetic heads for various other purposes on the periphery of the head-wheel or disk, for which rotary couplings are required on an individual or group basis, the provision of additional rotary couplings only for monitoring purposes involve undesired complication and expense of construction.

A method of optimizing adjustment of tape excitation by the individually mounted transducers on the periphery of a rotating head-wheel of a magnetic tape device is known from DE-AS No. 19 09 429. Here the longitudinal speed of the tape is reduced, a particular transducer is set for recording and the rest of the transducers located on the head-wheel are switched for reproducing, so that with partial overlapping of the tracks the read-out of the signals recorded by the first transducer, which are monitored and serve for adjusting the excitation of the first transducer. In that case, however, the subject matter involved a method described in connection with magnetic recording of analog frequency modulated signals.

A method for optimizing the tape excitation is also shown in DE-OS No. 27 58 307, in which by preferably linear raising of an excitation signal and differentiation of the reproduced signal the maximum of the latter is recognized and then the corresponding value of the exciter signal is determined and stored. For this either the magnetic tape velocity can be reduced, to zero if desired, or the speed of the head-wheel equipped with magnetic heads on its periphery can be drastically raised and the read-and-write procedure can be alternately carried out with the same magnetic head or with different magnetic heads. This method also is concerned exclusively with the magnitude of the reproduced output signal and has also been described only in connection with magnetic storage of analog signals.

SUMMARY OF THE INVENTION

It is an object of the present invention to provide a method of optimizing the adjustment of a magnetic tape machine in a manner that is specially suited for digitally coded color television signals and, if possible, to do so with the use of normal television signals rather than with test pulses.

Briefly, the magnetic head of the signal path to be optimized is alternately switched into the recording mode and into the reproduction mode in every crossing of the tape by that head, while the tape transport speed is reduced to such an extent that the magnetic head in its reproduction mode completely picks up the track written while that same head was in the recording mode. While in the recording mode digitally coded picture signals are supplied to the magnetic head and are recorded section by section. While the magnetic head is in the reproduction mode, the reproduced picture signal sections are examined for transmission errors. Finally, values of recording current, pre-emphasis before recording and de-emphasis after pick-up are set for the lowest error rate in order to obtain the best quality of the reproduced picture signal.

The process of the invention has the advantage of being particularly suited for digitally coded video signals and, moreover, the optimization procedure does not require the generation of its own test pulse sequence but rather uses the transmitted digitally coded picture signal. It is particularly useful that the pre-emphasis for recording and the de-emphasis after pick-up can be adjusted at the same time. It is furthermore advantageous that instead of adjusting the recording current to maximum reproduction sensitivity, the recording current of each magnetic head is adjusted for the smallest error rate in reproduction. In consequence the transmission reliability is advantageously influenced.

BRIEF DESCRIPTION OF THE DRAWINGS

The invention is further described by way of illustrative example with reference to the annexed drawing in which.

DESCRIPTION OF ILLUSTRATIVE EXAMPLE

Figure 1:
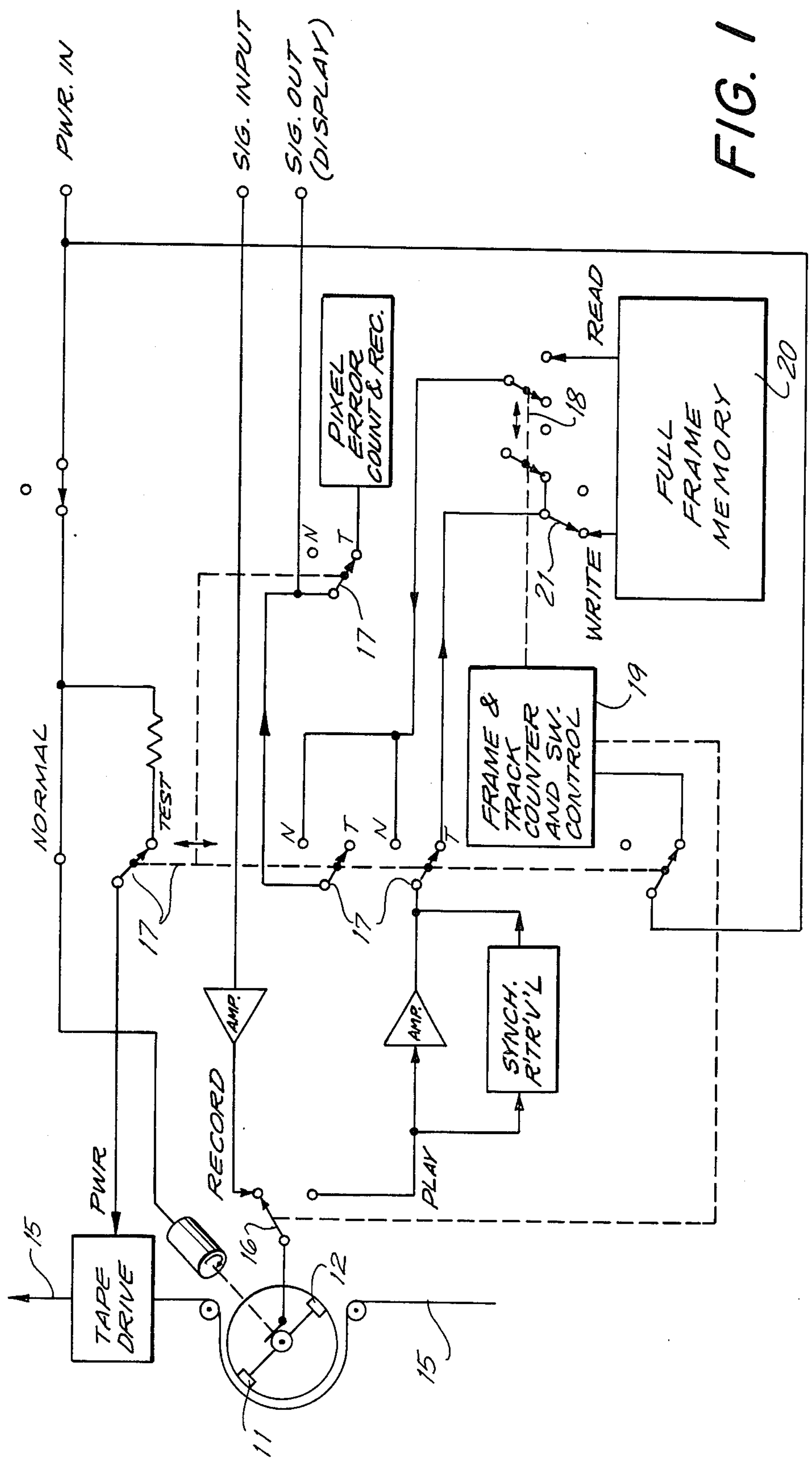
FIG. 1 is a diagram of an adjustment set-up for optimizing the revolving magnetic heads of a magnetic tape machine.

FIG. 1 shows schematically a magnetic tape machine for recording digitally coded color television signals having a revolving head-wheel 10 which carries two magnetic heads 11 and 12 arranged at opposite ends of a diameter of the head-wheel.

These magnetic heads can be used for recording of and also for reproduction from digitally coded signals recorded on or picked up from the magnetic tape 15, the recording mode being determined by appropriate switching of the circuits to connect a head in one case to a recording circuit and in the other case to a reproduction circuit. In the operation of this device a complete television frame is recorded in 25 tracks successively one next to the other and running obliquely across the width of the tape. These tracks are recorded alternately by these two magnetic heads and are likewise scanned alternately for reproduction by the two magnetic heads. In a television system in which every television frame has 625 television lines, the signals of 25 lines are recorded in each track.

For carrying out the optimization method tape transport speed is reduced just as in the known methods of optimization. This is done by means of the switch 17. In the present example the speed is reduced to 1/25 of the normal speed. In contrast with the known methods of optimization, however, a magnetic head is selected and is alternately utilized for recording a track and reproducing the track just recorded. In practice, a pair of heads may be thus selected, each to record a track and then used, in turn, to read the tracks recorded by the respective heads.

As a result of the drastic reduction of the magnetic tape transport speed the selected magnetic head operating in reproduction mode scans the previously recorded track almost completely, actually over about 11/12 of its width. The recorded signals are therefore reproduced with a good ratio of signal to noise that permits a satisfactory judgment or evaluation of the adjustment criteria.

Figure 2:
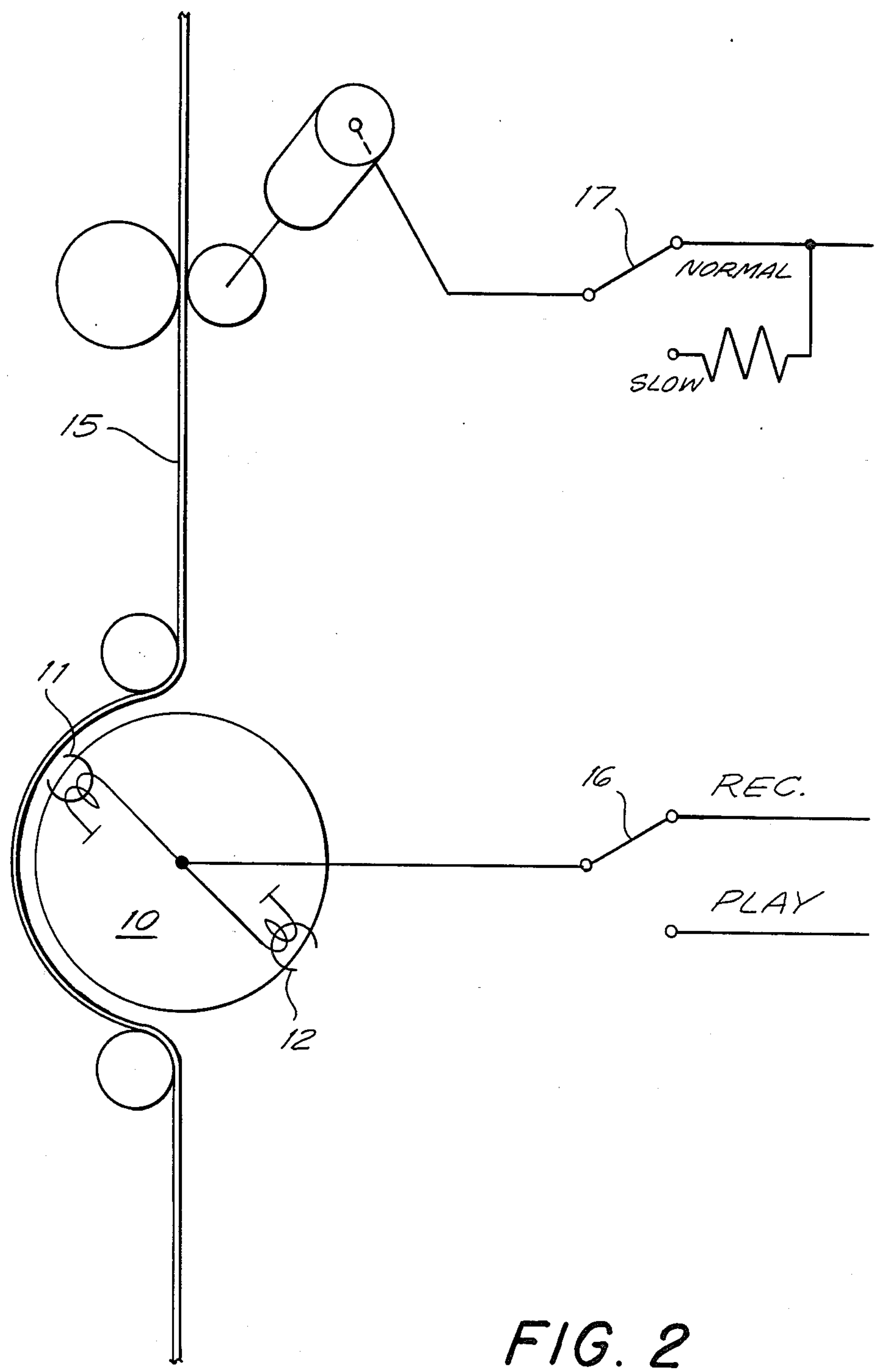
FIG. 2 is a more detailed diagram of the switched circuits of FIG. 1.

FIG. 2 shows more clearly the circuits switched by switches 16 and 17 of FIG. 1.

Table 1, set forth below, is an excerpt of a test run for optimizing on the basis of a picture signal in the set-up shown in the drawing. The last column of the table describes the operation to which each row relates. The second and fourth rows and similarly alternate rows thereafter are designated as involving an operation of "reproduction and entry in memory". This refers to the memory 20 of FIG. 1 which, as Table 1 shows, needs to be a full-frame memory. Such full-frame memories are already provided in many magnetic tape machines for recording of and reproducing from digitally coded television signals for purposes of various kinds of manipulation of the stored picture information.

In this case the television signal was a PAL type signal, in which each track contains 25 television lines.

As can be seen from Table 1 the picture is stored in the picture memory segment by segment, each segment corresponding to the signals recorded in one track. By operation of the switch 18 under control of the frame counter in the control circuit 19 (which also controls the recording of one segment per frame through the switch 21), the picture can be fully read out, reproduced on the picture screen of a picture monitor for a display device and thus subjected to a visual check. For better recognition of the errors, the disturbed picture points can be automatically set to the binary value 00(Hex) which corresponds to picture black, this being done in the circuit 40. This visual evaluation of the error rate is quite sufficient for many purposes of optimization. The drawings also shows additional possibilities involved in a further refinement of the method of the invention.

In this further refinement of the method there is not only included the error recognition circuit 40 but this circuit, instead of merely setting every defective pixel to picture black, also cooperates with a counter 45 that is reset counts the number of errors in each segment, transfers the result to an indicator circuit and is reset to start counting the errors in the next segment. The indicating device 50 is designed to show a running succession of error counts in parallel with readings of the various adjustments being made, so that the adjustment can easily be set to a value that has previously been shown to be optimal. In the drawing the printing out of the running display is also shown, although it is understood that that may be an unnecessary refinement.

By observation of the picture content of the signals successively stored in the memory in a rhythm that may be quite slow, for example changing every second or in case of the more refined system, also observing the indication of the error rate, the magnetic head can be adjusted for the value of recording current supply during recording, the setting of the pre-emphasis for recording and the setting of the de-emphasis following pick-up in a way that will produce a minimum error rate. Since the error rate can be measured as a digital number, it is also possible for the synchronization pulses to be allowed to run completely automatically, varying each adjustment in turn over a range and before going on to the next adjustment bringing the adjustment just made to the value found to have the lowest error rate.

Quite generally the storing up of the picture memory takes place in a time corresponding to 2 m frames, where m designates the number of track sections which in normal operation must be read out for providing a

TABLE 1

| | | | |
|---|---|---|---|
| 1.1 | Segment, frame 1, lines (t = 0 . . . 25 H) | 1–25 | recording, then switching head to reproduction |
| 2.1 | Segment, frame 1, lines (t = 50H . . . 75H) | 1–25 | reproduction and entry in memory |
| 3.2 | Segment, frame 2, lines (t = 650H . . . 675H) | 26–50 | recording, then switching head to reproduction |
| 4.2 | Segment, frame 2, lines (t = 700H . . . 725H) | 26–50 | reproduction and entry in memory |
| . | . | | |
| . | . | | |
| . | . | | |
| 49. 25. | Segment, frame 25, lines (t = 15600H . . . 15625H) | 601–625 | recording, then switching head to reproduction |
| 50. 25. | Segment, frame 25, lines /t = 15650 . . . 15675H) | 601 . . . 625 | reproduction and entry in memory |
| 51. 1. | Segment, frame 26 | | recording . . . |

full frame (complete picture made up of two interlaced picture fields).

The operation of the method and apparatus of the invention can be summarized briefly as follows:

A full-frame memory for television signals is filled while the tape transport speed is reduced to a small fraction of its normal speed while a selected of the head-wheel of a recorder-reproducer first records a segment of a frame recorded in one oblique track, then is switched to reproduction that reads the track just recorded. In the next frame a second segment is similarly recorded, reproduced and stored for the second frame, and so on. After a complete set of segments are put in memory a complete composite picture can be reproduced therefrom and of course the content of the memory can be displayed in the intervals between the recording of segments. A pixel error detector is used both for displaying errors by setting all recognizably faulty pixels to picture black and also counting the number of recognizably defective pixels per segment. While this evaluation procedure is being run, the recording current, the pre-emphasis and the de-emphasis adjustments can be varied so that they can ultimately be set at the settings which produce the lowest error rate in the reproduced picture.

Although the invention has been described with reference to a particular illustrative example, it will be understood that various modifications are possible within the inventive concept.

What is claimed is:

1. Method of optimizing the operation of a magnetic tape machine in the recording of sand reproduction from digitally coded color television signals, said machine having a plurality of magnetic heads mounted on a revolving head-wheel for obliquely crossing the surface of a tape being advanced lengthwise, means being provided for reducing the tape advance speed to a value which is a small fraction of normal tape-advance speed, and likewise means for selecting a particular head on said head-wheel for the optimization method and means for switching said selected head from recording to reproduction operation after recording an oblique track of signals across the tape and before the next pass of said head across the tape, and memory means for storing the reproduced signals and for evaluating the signals stored, comprising the steps of:

reducing the speed of tape advance to said small fraction of normal tape advance speed;

recording a one-track picture signal segment with a selected magnetic head followed by reproducing, by the same head on its next pass across the tape, the signal of the track most recently recorded by said selected head;

storing in memory the signals so reproduced;

repeating the foregoing steps of recording, reproducing and storing successively for different picture segments of different picture frames, advancing cyclically from one segment to the next over a succession of picture frames;

evaluating each stored segment for number of pixel errors per segment in an interval between the storing of a reproduced segment and the storing of the next following reproduced segment;

varying, at different times, during the above set forth repetitions of recording, reproducing and storing steps, the recording current, the pre-emphasis characteristic and the de-emphasis characteristic of circuits connected to said selected head, and, finally, adjusting said recording current, pre-emphasis characteristic, and de-emphasis characteristic of said circuits to the values thereof observed to correspond to the lowest number of pixel errors per second revealed by said evaluation steps.

2. Method according to claim 1, wherein said evaluation steps are performed by displaying the stored segments on a picture monitor for visual evaluation of picture quality.

3. Method according to claim 2, in which said evaluation steps are performed by recognizing the pixels which contain errors and replacing said pixels with pixels of picture black value to facilitate visual estimation of error rate.

4. Method according to claim 1, in which said evaluation steps are performed by recognizing pixels containing errors, counting the number of recognized pixel errors per segment and displaying a running count of pixel errors per segment.

5. Method according to claim 4, in which the magnitude and direction of varying said recording current, pre-emphasis characteristic and de-emphasis characteristic are displayed in correlation with said running count of errors per segment.

* * * * *